United States Patent
Kjeldsen et al.

(10) Patent No.: US 7,400,776 B2
(45) Date of Patent: Jul. 15, 2008

(54) VISUAL ENHANCEMENT FOR REDUCTION OF VISUAL NOISE IN A TEXT FIELD

(75) Inventors: Frederik Carl Moesgaard Kjeldsen, Poughkeepsie, NY (US); Robert Bruce Mahaffey, San Fafael, CA (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 11/032,209

(22) Filed: Jan. 10, 2005

(65) Prior Publication Data

US 2006/0153452 A1 Jul. 13, 2006

(51) Int. Cl.
*G06K 9/40* (2006.01)
*G06K 15/00* (2006.01)
(52) U.S. Cl. ............................... 382/254; 358/1.11
(58) Field of Classification Search ............... 382/128, 382/176–178, 254, 263, 266, 270–272; 358/1.11, 358/3.27, 462, 463, 532
See application file for complete search history.

(56) References Cited

U.S. PATENT DOCUMENTS

| | | | | |
|---|---|---|---|---|
| 5,583,659 A | * | 12/1996 | Lee et al. | 358/3.13 |
| 5,649,024 A | * | 7/1997 | Goldsmith | 382/170 |
| 6,227,725 B1 | * | 5/2001 | Ancin et al. | 358/1.9 |
| 6,912,301 B1 | * | 6/2005 | Lin et al. | 382/128 |
| 7,177,472 B2 | * | 2/2007 | Karidi et al. | 382/176 |

* cited by examiner

*Primary Examiner*—Kanji Patel
(74) *Attorney, Agent, or Firm*—Carr LLP; D'Ann Rifai (57) ABSTRACT

The present invention provides for visual enhancement of text. A text area is selected. A plurality of non-identical images of the text area are captured. Background information is removed from these images. The contrast characteristics of text area of the plurality of images are increased. The contrasted images are combined so as to increase their effective resolution. In an alternative embodiment, the text picture is broken up into a plurality of component colors, and these colors are then sharpened and recombined.

4 Claims, 9 Drawing Sheets

SEARCH AREA

SEARCH AREA

VISUAL ENHANCEMENT FOR REDUCTION OF VISUAL NOISE IN A TEXT FIELD

TECHNICAL FIELD

The present invention relates generally to visual noise reduction in images of text and, more particularly, to visual noise reduction for the sight impaired.

BACKGROUND

In conventional technologies, people with sight disabilities would like to read newspapers, books, and so on. One of the problems with the presentation of text in these mediums is that there can be a fair amount of background clutter. For instance, a watermark (the Wells Fargo® coach, for instance) can interfere with someone's ability to read the check on which the watermark appears if the person has a vision impairment. To compensate for this problem, several conventional approaches have been tried.

One conventional approach involves character recognition. In this approach, software looks at a pixilated photograph and tries to recognize certain letters of the alphabet, and these are output to the end user as an enhanced text field. However, there are problems with this approach. For instance, OCR has problems dealing with text of differing formats and sizes, backgrounds can interfere with OCR, and the process generally requires very high quality, high resolution images, such as produced by a document scanner.

Another approach is to use simple magnification on the image (either analog or pixilated), where each picture element of the image is displayed larger than life size. While this can help with some visual impairments, with others it does not provide much benefit. Additionally, there are problems with simply magnifying images with no image processing. When magnifying pixilated images the large pixel elements start to become visible, making the image blocky and harder to read. The background noise and clutter is also magnified, and often can become even more of a distraction than in the unmagnified image.

A third conventional approach, often used with the magnification approaches described above, is to try to adjust the contrast in a picture. This can be very good for situations wherein the background is uniform and hard to differentiate from the letters. However, non-uniform backgrounds, either due to non-uniformity in the printed matter itself, or due to variations introduced during the imaging process, for example, by non-uniform lighting, can receive the same kinds of contrast enhancements as the type-face, thereby making the characters difficult or impossible to read.

Therefore, there is a need for a system to aid in the reading of documents in a manner that addresses at least some of the deficiencies of conventional text reading systems.

SUMMARY OF THE INVENTION

The present invention provides for visual enhancement of text. A text area is selected. A plurality of non-identical images of the text area are captured. Background information is removed from these images. The contrast characteristics of text area of the plurality of images are increased. The contrasted images are combined so as to increase their effective resolution.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

In the remainder of this description, a processing unit (PU) may be a sole processor of computations in a device. In such a situation, the PU is typically referred to as an MPU (main processing unit). The processing unit may also be one of many processing units that share the computational load, such as a Digital Signal Processor (DSP), according to some methodology or algorithm developed for a given computational device. For the remainder of this description, all references to processors shall be understood to refer to either a main processing unit (MPU) or one of many processing units that share the computational load, such as a Digital Signal Processor (DSP), unless otherwise indicated.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
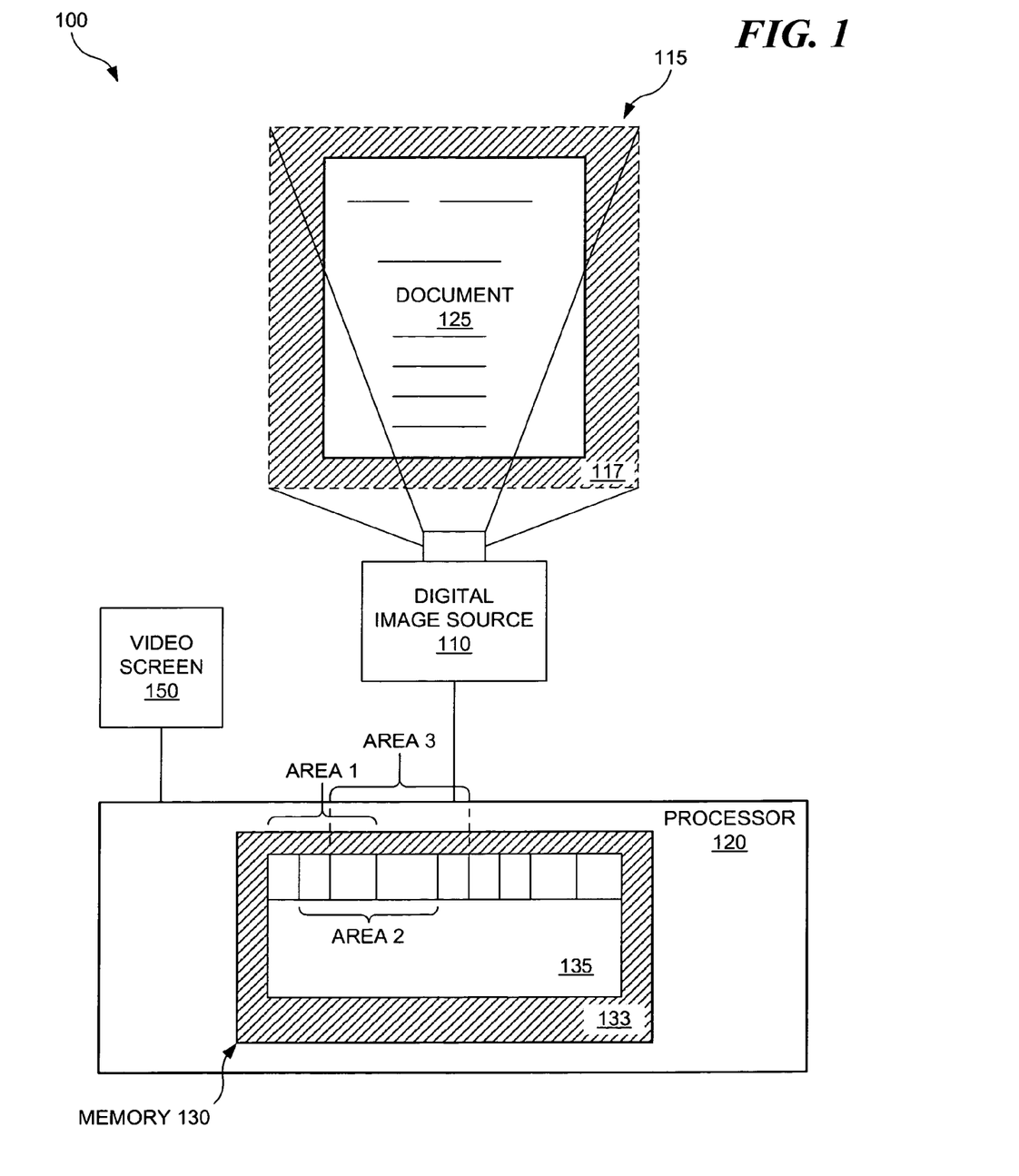
FIG. 1 schematically depicts a system for imaging a document for enhancement.

Turning to FIG. 1, the reference numeral 100 generally indicates a system for capturing images that someone with a visual impairment wishes to more fully be able to read. A digital image source 110, such as a digital still or video camera, uses its area of vision 115 to scan a document 125. An image for viewing may also be received from another digital source, such as the internet. Where the field of view 115 is larger than the document 125, an area 117 exists beyond the edges of the document 125 (outside of the document) yet within the field of view of the digital image source 110. In this example, the digital image source 110 is coupled to a processor 120 having a memory 130. An image of the document 125 is captured by the digital image source 110 and stored in memory 130 of the processor 120. The processor is coupled to a video screen 150, upon which the captured image can be displayed.

The processor 120 has two separate logical areas of memory 130. The first is memory area 133 corresponding to the area 117 outside of the document (or outside of a selected region of the document) but still within the field of view 115 of digital image source 110. Within the memory 130, there is also selected region memory 135 corresponding to the document 125 (or a selected region of the document). The selected region memory 135 is subdivided into a plurality of areas: an area 1, an area 2, an area 3, up to an area "n". These areas correspond to areas of the document 125, after these areas are processed by the processor 120. Then, the output of that digital signal processing is employed in the processing of the next element, and so on. In the system 100, a Digital Signal Processing (DSP) technique is used in which the foreground materials and the background materials are differentiated.

The visual enhancement system 100 differs from conventional technology in at least its approach to ensuring that the visually impaired can read. The system 100 performs digital signal processing upon the captured image of the document 125 to make it more readable, as opposed to simple enlargement or optical character recognition. These digital processing techniques can include such processing techniques as edge sharpening. Another tool that can be used in the present invention is the technique of Mosiacing. Generally, Mosiacing is used when the document is larger than the camera's field of view so that multiple images must be taken to encompass the entire document, then reassembled in the computer memory to create a complete image of the document. However, other techniques are within the scope of the present invention.

First, the processor 120 determines the corners or boundaries of the document itself. The processing that follows only occurs within the image of the document 125 itself. Then, processing occurs on the document itself to differentiate foreground materials from background materials. The foreground materials are then presented to the end user.

In the system 100, the image of the document 125 is represented in memory region 135 and evaluated in various (overlapping) areas 1, 2, 3, ... n. Data processing occurs on the first area to sharpen-up text. The area is then moved across the image ever so slightly, and data processing again occurs for this next area. This process is performed over the surface of the entire image until all areas with differential change in their horizontal or vertical areas have been processed. Then, these areas are summed. This should enhance the foreground text and suppress the background clutter, making the text easier to distinguish. Furthermore, there is an increased resolution phase where multiple images (and multiple color channels within the image) are aligned and combined so as to increase the amount of detail (resolution) in the image. The processed text image is then output on a video screen 150 coupled to the processor 120, or on some other display device. Because the resolution has been increased, it can be magnified without introducing distortion that would make it harder to read. Therefore, the system 100 can enhance text for a visually impaired user.

In conventional technology, each pixel size of the image of document 125 can be increased, thereby increasing the size of the image. However, additional processing of the video for video screen 150 or other video device is not increased, other than perhaps for contrast and brightness typically available in a digital camera. In the processor 120, however, other processing is performed upon the captured image to make it more readable.

In a further embodiment, although OCR is not used within the present invention, this invention performs the "pre-processing" useful for OCR to occur. The processing can occur in a laptop or desktop computer, a PDA (personal digital assistant), or some other portable reader device.

Figure 2A:
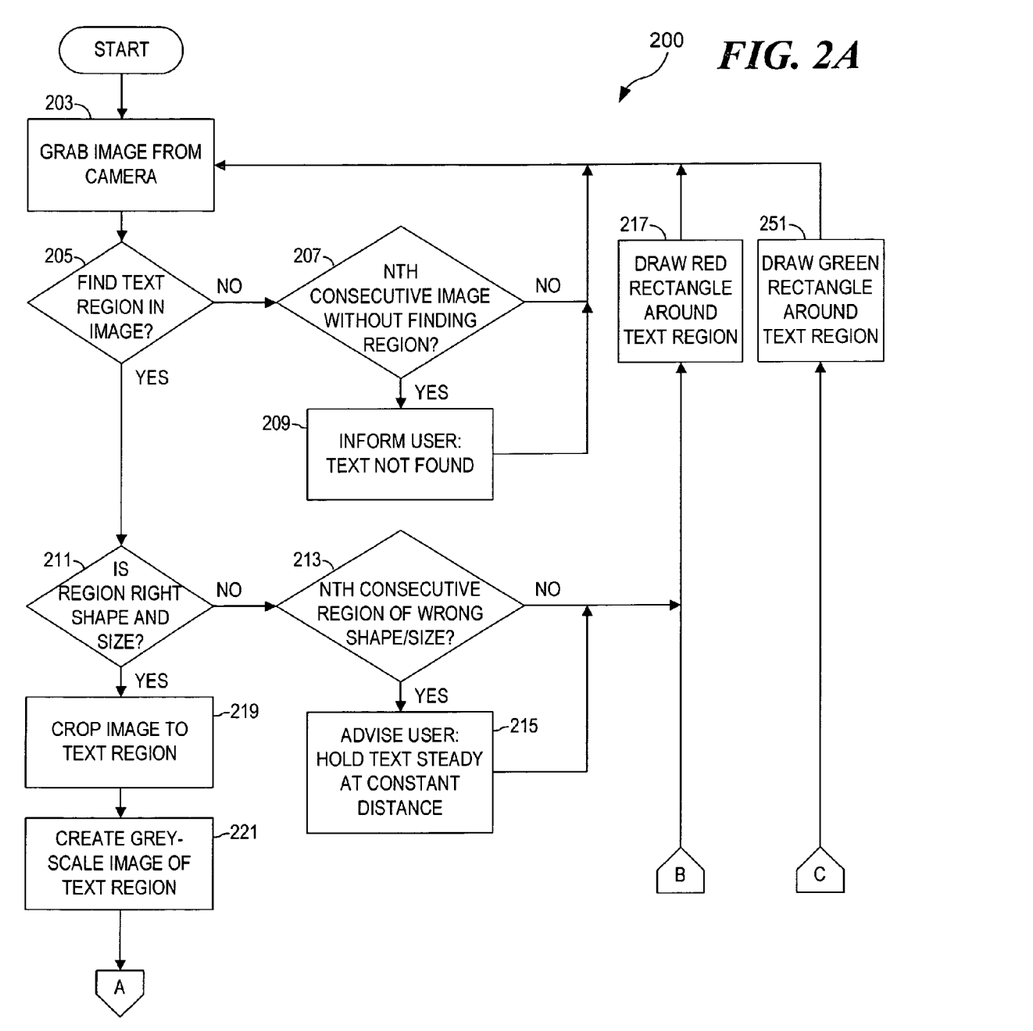
FIG. 2A-2B illustrate a method for grabbing a plurality of images of the text suitable for enhancement.
Figure 2B:
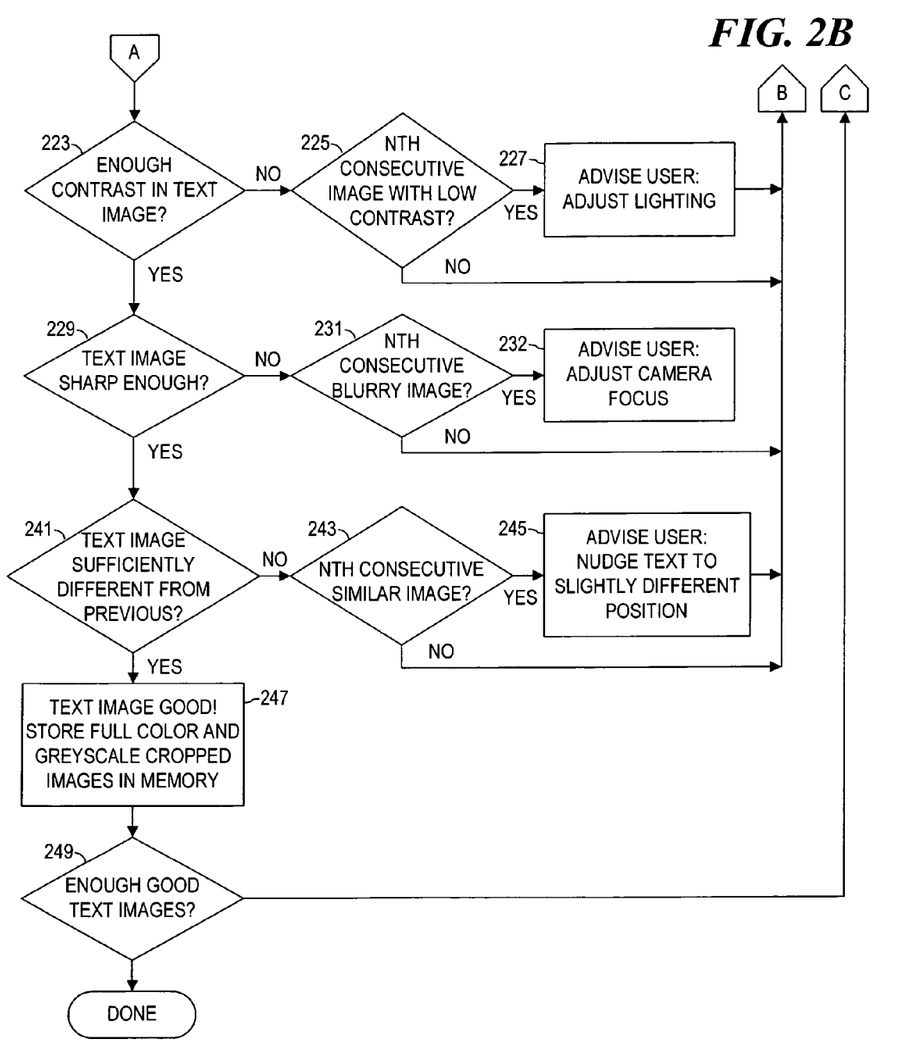

Turning now to FIG. 2, illustrated is a method 200 for selecting a plurality of text images to be processed. After a start step, a camera grabs an image in step 203. In step 205, it is determined if it contains a text region.

In the system 100, small documents like a check or business card, which are entirely visible within the image, are processed, and the system 100 looks for a rectangular document boundary. Alternatively, the user could select a region of a document, which could then be tracked over multiple images and used to identify the desired text. Other people have done excellent work in detecting text regions in images, and many of their techniques could be incorporated.

If no text region is found, it is determined if this is the nth consecutive image without a text region in step 207. If it is the nth or higher consecutive image, the user is informed that the text could not be found in step 209, and step 203 commences again.

However, if the photographed region contains a text region, in step 211, it is determined whether the region grabbed is the right shape and size. Alternatively, other text-finding techniques are used, and they would have specific test designed to verify the validity of the text region. If the text region does not pass these tests, in step 213, it is determined whether this is the nth consecutive photographed region of the wrong shape or size. If it is not, in step 216, a red rectangle is drawn around the text region In one embodiment, colored rectangles are drawn to provide feedback to the user that the system is having trouble finding a good text image. In order to enter a document into the system, a user would hold it up in front of a camera. They would observe the real-time video image on the screen to see if it is visible to the camera. These red/green boxes drawn around what the system thinks is the text region provide immediate feedback of whether the system is getting a usable image, or if the user should perhaps move the document around to get a better image, hold it steadier, or even change the lighting. Essentially, the user just holds the document up to the camera, if they see red, they move it around a bit till they see green, then hold it steady like that for a few seconds. When the system has all the images it needs, they get a message, and know they can put the document down. Of course, one can do the same thing with the document on the table, and holding the camera.

If it is the nth consecutive region of the wrong shape or size, then in step 215, the user is advised to hold the text steadily and at a constant distance from the camera. Then, a red rectangle is still written around the text region in step 217.

However, if the region is the right shape and size, the image is cropped to the text region in step 219. In step 221, a grey-scale is created of the image of the text region. What follows are a sequence of tests to determine if the text image is suitable to take part in the enhancement process.

In step 223, it is determined whether there is enough contrast in the text image that was grabbed. If there is not, in step 225, it is determined whether this is the nth consecutive photographed region with low contrast. If it is not, in step 217, a red rectangle is drawn around the text region. If it is, in step 227, the user is advised to adjust the lighting. Then, a red rectangle is still written around the text region in step 217.

In step 229, it is determined whether the text image is sufficiently sharp (edges of the text resemble a step rather than a ramp in intensity). Several methods for performing this test will be known to one skilled in the art. If it is not, in step 231, it is determined whether this is the nth consecutive photographed region that is blurry. If it is not, in step 216, a red rectangle is drawn around the text region. If it is, in step 232, the user is advised to adjust the camera's focus. Then, a red rectangle is still written around the text region in step 217.

Subsequent image processing relies on the text characters being in slightly different locations with respect to the pixels in each image. However, if a fixed camera is used and the document is stable, for example, it is lying on a table, then some means must be introduced to move the document slightly within the camera image. Therefore, in step 241, it is determined whether the text image is sufficiently different from previous photographs. If it is not, in step 243, it is determined whether this is the nth consecutive similar image. If it is not, in step 216, a red rectangle is drawn around the text region. If it is, in step 245, the user is advised to nudge the text into a slightly different position. Then, a red rectangle is still written around the text region in step 217.

In one embodiment, the test in step 241 was performed by subtracting one image from the other and check if the remainder was above a threshold. However, those of skill in the art understand that there are a number of ways of determining if text is sufficiently different. If the text image is sufficiently different, a determination is made that the text image is a good candidate for further processing. In step 247, both its full color cropped images are stored in memory.

One skilled in the art may determine that not all the preceding tests (223, 229, 235 and 241) are needed to verify an image for processing, or that additional tests are needed. These changes fall within the scope of the current invention.

In step 249, it is determined whether we have enough good text images. If no, then in step 251, a green rectangle is drawn around the text area, and step 203 again commences. If there are enough images, then in step 253, we are finished.

Figure 3:
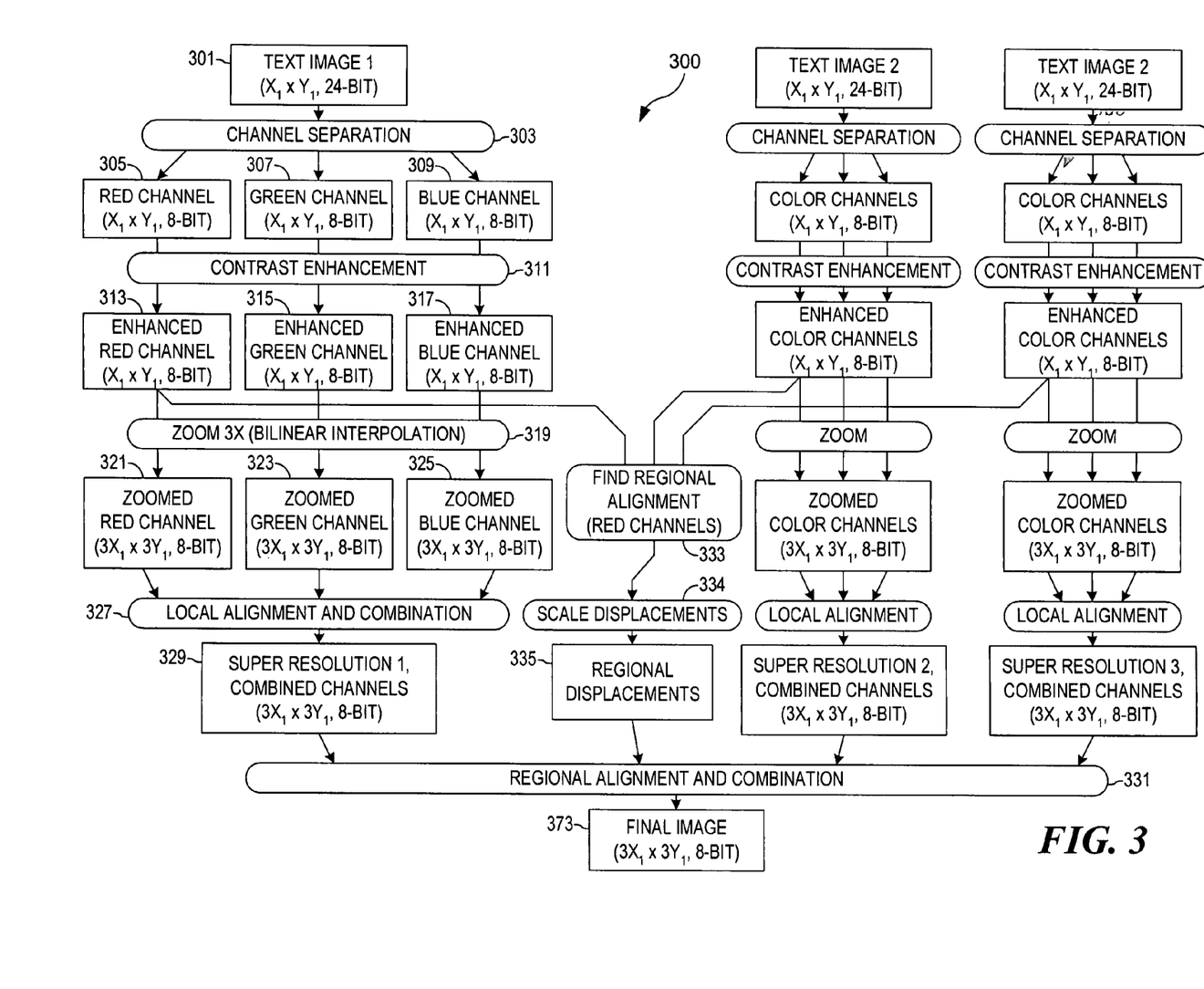
FIG. 3 illustrates a method to visually enhance a document through separation, enhancement, zooming, alignment and recombination of the color channels over a plurality of images.

Turning now to FIG. 3, illustrated is a method 300 for processing text images. In the method 300, the processing of a text image 1 is shown in detail. However, those of skill in the art understand that the processing of text image 2 and text image 3 is essentially identical, but are summarized here for purposes of clarity.

In a step 301, there is a full color text image. Such as a 24 bit depth, 8 bits per color plane. It is possible to begin with gray images, skipping the channel separation and recombination steps, but the results are generally better when starting with full color images. In step 303, there is color channel separation. The red channel is separated in step 305, the green channel is step 307, and the blue channel in step 309. Within each separate channel, the contrast is enhanced. This creates an enhanced red channel 313, and enhanced green channel 315, and an enhanced blue channel 317.

Then in step 319, image zooming is used so that image resolution in both x and y is made 3× larger (the total image is 9× larger) using bilinear interpolation between the pixel values in the original image to obtain the intermediate pixel values in the zoomed image (technique known to anyone skilled in the art. However, other zooming techniques could be used, including pixel replication or other interpolation techniques). Any zoom factor could be used. In one embodiment, a factor of 3 provides a good tradeoff between processing time and good quality results.

This creates a zoomed red channel 321, a zoomed green channel 323, and a zoomed blue channel 325.

Then, in step 327, the offset of a small region around each pixel between the zoomed color channels are determined as will be described with FIG. 5. In step 329, these offsets are used to precisely align each pixel so the three zoomed color channels can be recombined into a single image having both greater resolution and higher clarity than the original image in 301. The alignment in step 329 is usually necessary because in many cameras the three color channels are obtained from three different pixel elements with slightly different spatial locations, making textual elements appear in slightly different locations in each channel's image. The result of this recombination from each of the initial text images (Image 1, Image 2 and Image 3 in this case) are input into step 331, the regional alignment and combination.

Figure 6A:
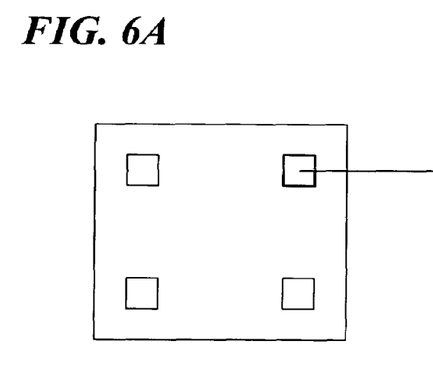
FIGS. 6A and 6B help illustrate the step of regional alignment of multiple images.

In step 333, the enhanced red channel 313 from text image 1, the enhanced red channel from text image 2, and the enhanced red channel from text image 3 are used to correlate the change in position of the text between the text images. This process will be described using FIG. 6. 334 represents the displacements between the text images at several locations. In step 335, these displacements are corrected for the zooming that took place in step 319. In step 331, these zoomed regional displacements are interpolated to determine a displacement for each pixel in the image. These displacements are used to align each pixel between the zoomed text images so that these images can be combined into a single image having both greater clarity and greater resolution than the original text images. This process is essentially identical to the process in step 327 (described below), except that the search area in the second image for each region of the first image is offset by the pixel displacements. 373 represents the final enlarged, processed image.

Figure 4A:
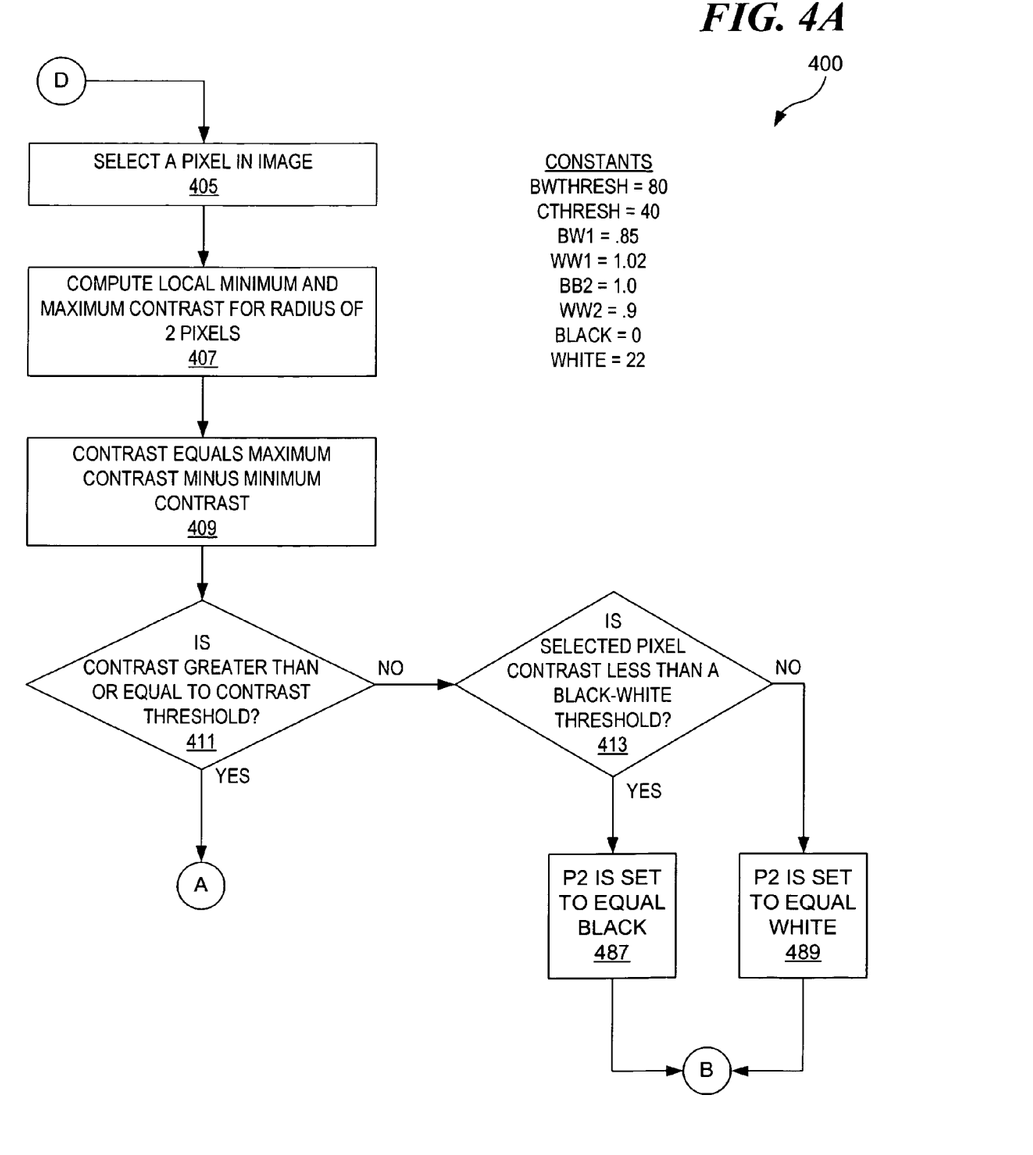
FIGS. 4A-4C illustrate a method for enhancing the contrast of an individual color channel of a selected image of a document.
Figure 4B:
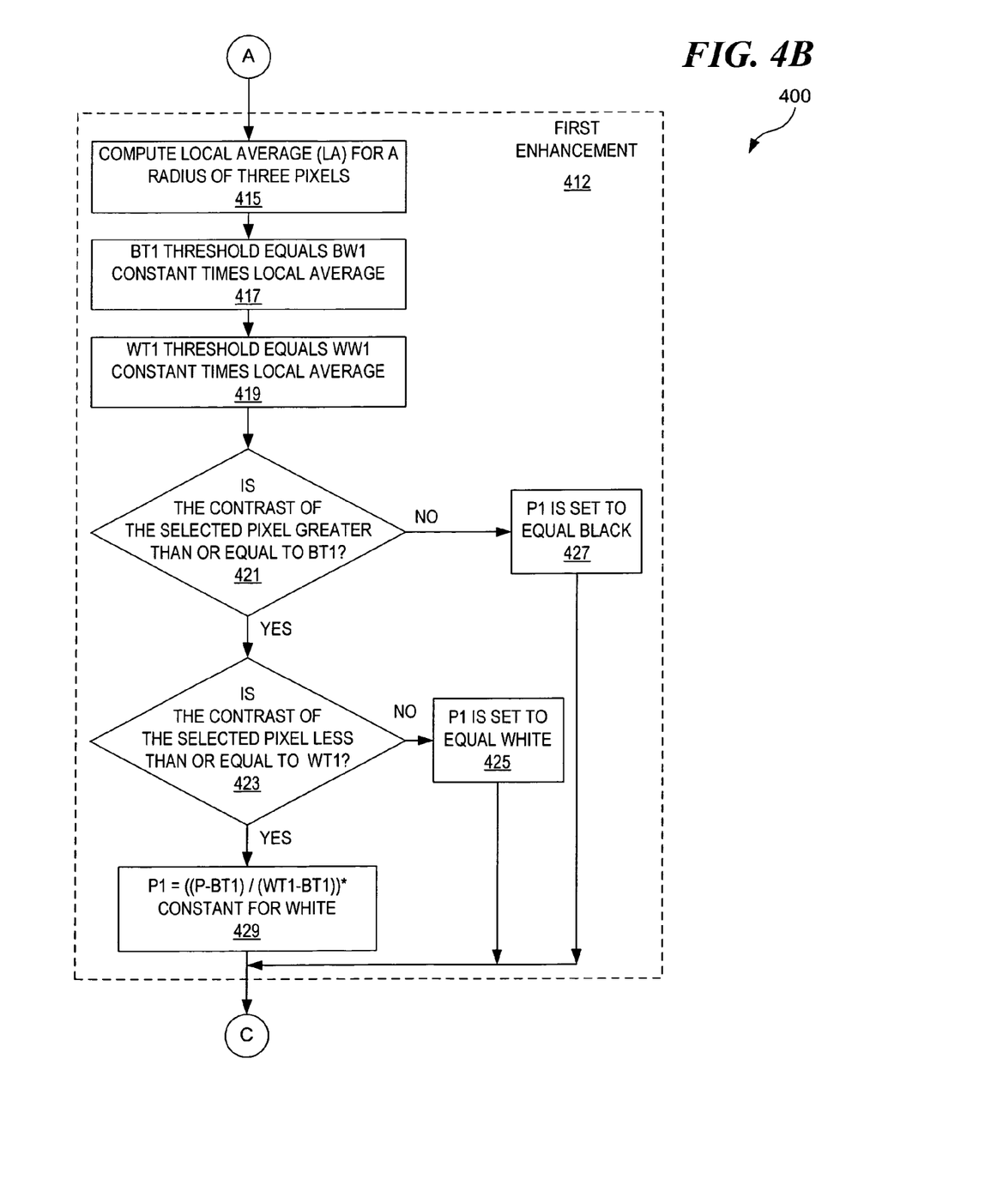
Figure 4C:
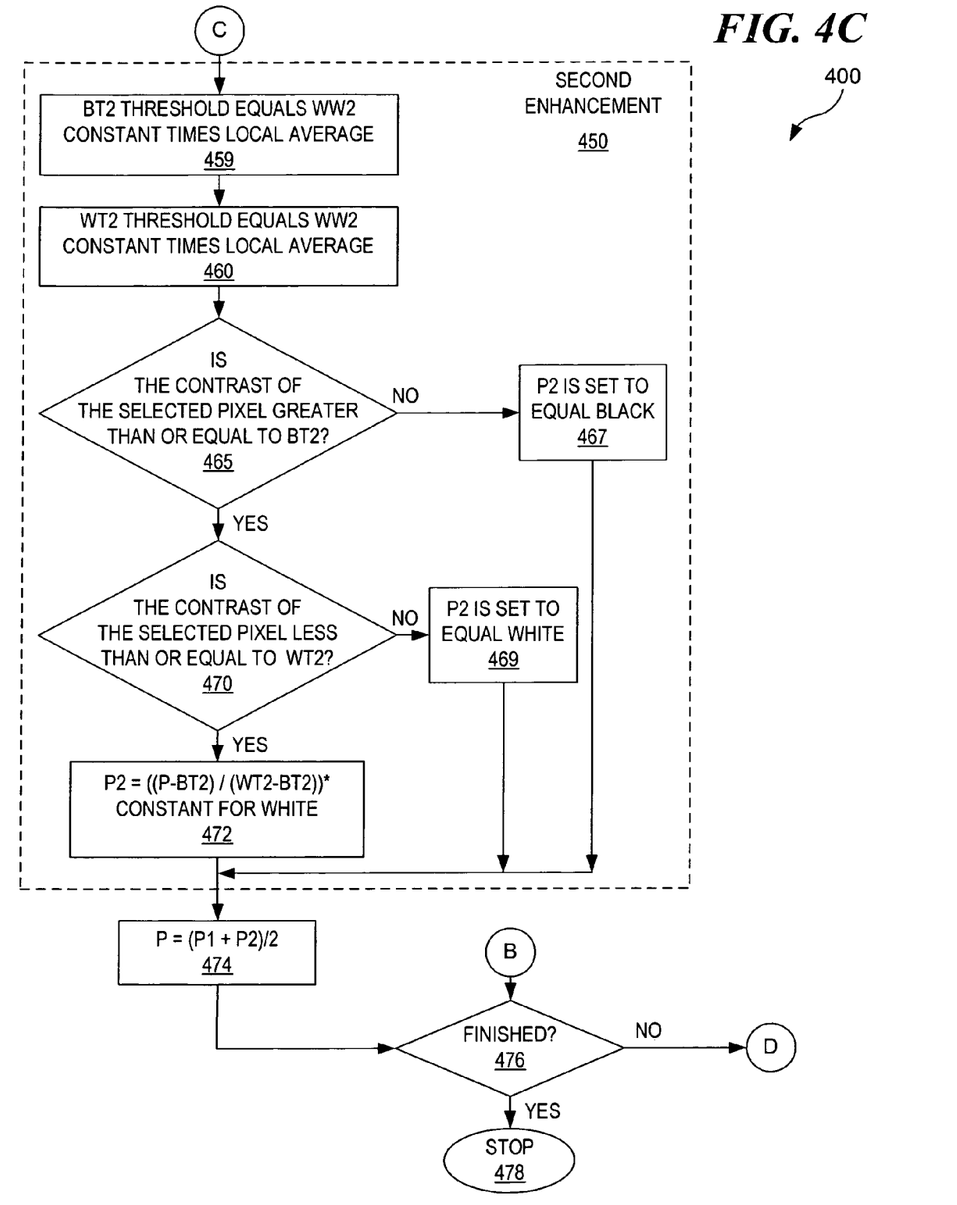

Turning now to FIGS. 4A-4C, the reference numeral 400 generally indicates a method for enhancement of images within the processor 120 (corresponding to step 311 in FIG. 3). In the method 400, a pixel from a digital document is processed. Generally, in the method 400 the contrast in a small local region around a pixel is tested. If this local contrast is low, the pixel is forced to be black or white. This process reduces the random visual noise in a document. If the pixel has not been forced to black or white (that is, the contrast is high in the local region), then a new pixel is computed by averaging the result of two sharpening algorithms. The various algorithms can emphasize various aspects of the document. Generally, the first enhancement 412 (FIG. 4B) determines whether to make a constant black, white, or an average of the pixels in the radius of the local area. The constants values are contrast values for a grey scale of 455, and some sample constants are illustrated in FIG. 4A, although those of skill in the art understand that other scales are within the scope of the present invention.

In step 405, a pixel of the image is selected. In step 407, the contrast values for pixels in a neighborhood, such as a radius of two, are read. In step 409, the contrast (C) value is the maximum contrast of the pixels in the area minus the minimum contrast of the pixels in the area. In step 411, it is determined whether this contrast is less than a threshold value.

If the contrast is below the threshold, it is then determined in step 413 whether the individual pixel is above or below a threshold. If the individual pixel is less than the threshold, the pixel is set to black in step 487. If the individual pixel is not less than the selected threshold, the selected pixel is set to white in step 489. In step 476, the method 400 determines whether the method 400 is finished. If it is finished, the method 400 stops in step 478. If it is not finished, the method starts again in step 405. However, if in step 411, the contrast between the darkest pixel and the palest pixel is greater than or equal to a threshold, a first enhancement 412 (FIG. 4B) begins.

Within the first enhancement 412, a local average for the pixels in the radius picked in step 407 is determined in step 415. In step 417, a threshold, a BT1 threshold, equals the user-defined BW1 constant times the local average of pixels as defined in step 415. In step 419, a threshold, a WT1 threshold, equals the user-defined BW1 constant times the local average of pixels as defined in step 415.

In step 421, it is determined whether the contrast P of the selected pixel is greater than or equal to BT1. If the contrast of the selected pixel is not greater than or equal to BT1, the constant p1 is set to equal black in step 427. If, in step 421, the contrast of the selected pixel is greater than or equal to BT1, it is determined in step 423 whether the contrast of the selected pixel is less than or equal to WT1. If the contrast of the selected pixel is not less than or equal to WT1, then in step 425 the constant p1 is set to equal white. If, in step 423, the contrast of the selected pixel is less than or equal to WT1, then in step 429 the constant P1 is set equal to (the contrast of the selected pixel minus the threshold BT1) divided by (the threshold WT1 minus the threshold BT1) times the value of white, or:

$$((P-BT1)/(WT1-BT1))*\text{the value of white}.$$

A second enhancement 450 is then performed (FIG. 4C). In step 459, a second threshold, BT2 is set. BT2 equals the BW2 threshold times the local minimum value derived in step 405. In step 460, the WT2 threshold equals the value of WW2 times the maximum value derived in step 407. Then, in step 465, it is determined whether the contrast of the selected pixel is greater than or equal to BT2. If the contrast of the selected pixel is not greater than or equal to BT2, the value of P2 is set equal to black in step 467. If the contrast of the selected pixel is greater than or equal to BT2, then in step 470 it is determined whether the contrast of the selected pixel is less than or equal to WT2. If the contrast of the selected pixel is not less than or equal to WT2, then in step 469 the value of P2 is set equal to White. If in step 470 the contrast of the selected pixel is less than or equal to WT2, then in step 472 the constant P2 is set equal to (the contrast of the selected pixel minus the threshold BT2) divided by (the threshold WT2 minus the threshold BT2) times the value of white, or:

$$((P-BT2)/(WT2-BT2))*\text{the value of white}.$$

In any event, the value of P after sharpening is set as the average of the two constants, P1 and P2, as calculated in the first enhancement 412 and the second enhancement 450. In step 476, the method 400 determines whether it is finished. If the method is not finished, step 405 is again executed. If the method is finished, then the method stops in step 478.

Figure 5A:
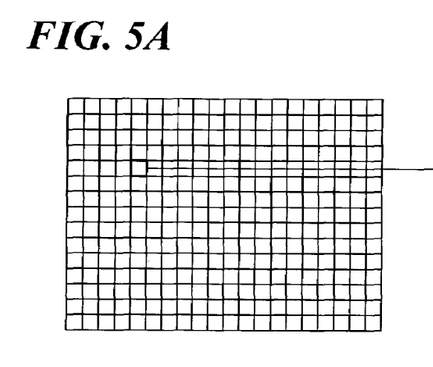
FIGS. 5A and 5B help illustrate the step of local alignment for recombination of images.
Figure 5B:
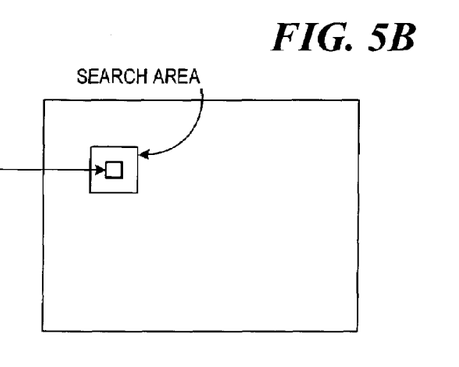

Turning now to FIGS. 5A and 5B, illustrated is step 327, "Local Alignment and Combination", in more detail. The minor spatial distortion are compensated between them as follows.

As illustrated, one image is divided into, in one embodiment, a 20×15 rectangular areas. For each of these areas, a portion of the other image, 8 pixels on a side larger than the original area is searched, to find a corresponding area where the intensity pattern matches best. The matching criterion is the sum-of-absolute-difference of the pixels in the areas of each image, though other matching criteria, known to those skilled in the art, could be used. The value of each pixel in the best matching area in the second image is averaged with the corresponding pixel in the area of the first image to reach a combined value. If more than two images are being combined, the search proceeds between the first image and each other image in turn, then the pixel values from the matching areas of each image are averaged to achieve the final value.

Figure 6B:
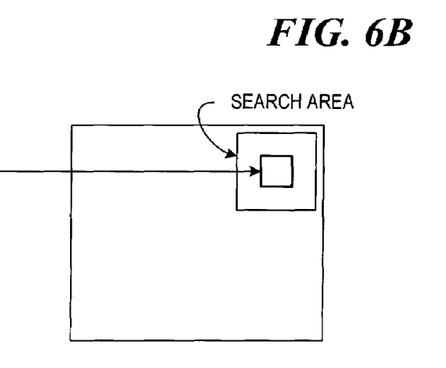

Turning now to FIGS. 6A and 6B, illustrated is step 333 "Find Regional Alignment" in more detail. Find Regional Alignment determines the approximate displacement of each point in one image with respect to another on the basis of visual similarity. The pixel pattern in a region near each corner of the first image, ⅕ the width and ⅕ the height in from the corner, for example, is selected.

For each of these regions, a portion of the other image is searched for a corresponding region where the intensity pattern within matches best. The matching criterion is the sum-of-absolute-difference (SAD) of the pixels in the regions of each image, though other matching criteria, known to those skilled in the art, could be used. If no match is found (SAD above a threshold), a slightly different region is selected in the first image and the search is repeated. When a matching region is found for each corner, the displacement at each of those four points between the two images is linearly interpolated to determine the displacement at each point in the two images.

Figure 7A:
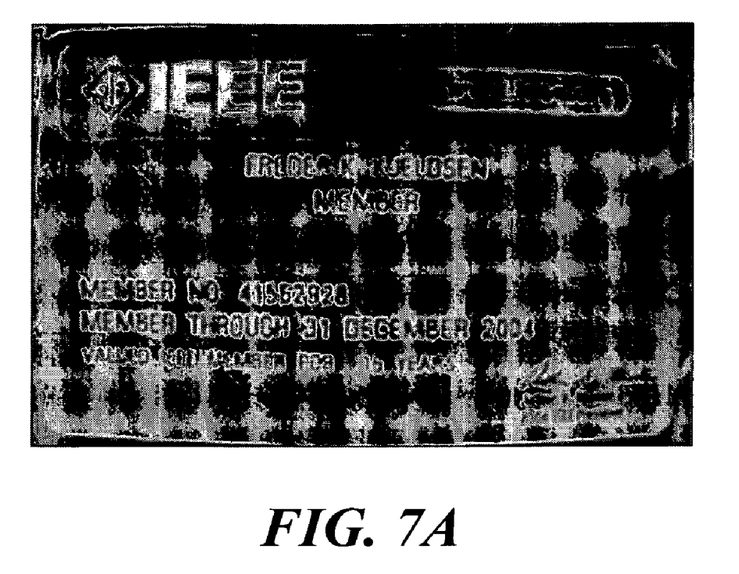
FIG. 7A illustrates an image of a document to be enhanced.
Figure 7B:
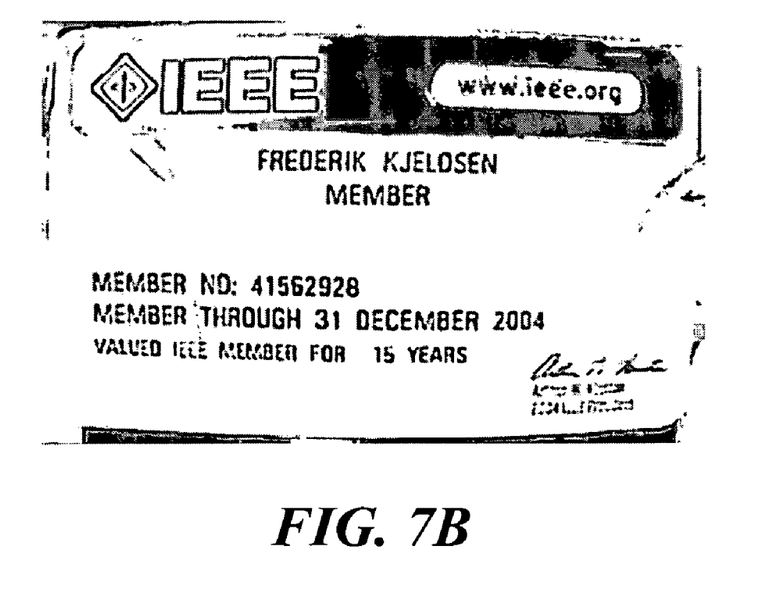
FIG. 7B illustrates an image of a document that has been processed by the method for enhancing.

Turning now to FIG. 7A, illustrated is an image of a card before the system 100 has processed the image. FIG. 7B illustrates the image after processing has occurred. In FIG. 7B, text information has been given a great deal more emphasis, and the contrast between light and dark has been greatly increased, while the fine detail in the text, important for easy reading, has been preserved, thereby helping the visually impaired to extract text information from a non-white background.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A method for providing visual enhancement of text, comprising:
   selecting a pixel within a text image;
   determining a local minimum contrast and a maximum contrast in a radius of pixels from the selected pixel wherein the radius comprises at least two pixels;
   setting a first contrast measurement equal to the difference between the maximum contrast of a pixel in the radius of pixels from the minimum contrast of a pixel in the radius of pixels;
   determining if the first contrast measurement is equal to or greater than a threshold;
   if the first contrast measurement is equal to or greater than a threshold, calculating a first pixel value and a second pixel value;
   if the first contrast measurement is equal to or greater than a threshold, averaging the first pixel value and the second pixel value; and if the first contrast measurement is equal to or greater than a threshold, setting the contrast of the selected pixel to the average of the first pixel value and the second pixel value thereby enhancing the text image.

2. The method of claim 1, wherein if the measured contrast is not greater than or equal to a threshold, and the selected pixel is less than a second threshold, setting the contrast of the pixel equal to black.

3. The method of claim 1, wherein if the measured contrast is greater than or equal to a threshold, and the selected pixel is less than a second threshold, setting the contrast of the pixel equal to white.

4. The method of claim 1, wherein the step of calculating the first pixel value further comprises computing an average pixel contrast of the selected radius.

* * * * *